(12) United States Patent
Kondo et al.

(10) Patent No.: US 12,224,413 B2
(45) Date of Patent: Feb. 11, 2025

(54) STORAGE BATTERY DEVICE

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Atsumi Kondo, Saitama (JP); Osamu Yamazaki, Fuchu (JP); Keizo Hagiwara, Kita (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 573 days.

(21) Appl. No.: 17/607,934

(22) PCT Filed: Apr. 17, 2020

(86) PCT No.: PCT/JP2020/016944
§ 371 (c)(1),
(2) Date: Nov. 1, 2021

(87) PCT Pub. No.: WO2020/226041
PCT Pub. Date: Nov. 12, 2020

(65) Prior Publication Data
US 2022/0320614 A1    Oct. 6, 2022

(30) Foreign Application Priority Data
May 9, 2019  (JP) .................. 2019-089261

(51) Int. Cl.
*H01M 50/204* (2021.01)
*G01K 7/00* (2006.01)
(Continued)

(52) U.S. Cl.
CPC ............ *H01M 10/486* (2013.01); *G01K 7/00* (2013.01); *H01M 10/48* (2013.01);
(Continued)

(58) Field of Classification Search
CPC ............ H01M 50/209; H01M 50/213; H01M 50/204; H01M 10/486; H01M 10/482
See application file for complete search history.

(56) References Cited

U.S. PATENT DOCUMENTS 3,540,283 A * 11/1970 Dean .................. G01K 7/42
327/512
2013/0141828 A1   6/2013 Yamaguchi et al.
2018/0366791 A1  12/2018 Kondo et al.

FOREIGN PATENT DOCUMENTS

CN   109690812 A    4/2019
DE   102014200180 A1   7/2015
(Continued)

OTHER PUBLICATIONS

International Search Report mailed on Jul. 7, 2020 in PCT/JP2020/016944 filed on Apr. 17, 2020 (citing references AN and AV therein, 2 pages.
(Continued)

*Primary Examiner* — Kenneth J Douyette
(74) *Attorney, Agent, or Firm* — Maier & Maier, PLLC

(57) ABSTRACT

A storage battery device including a housing, battery packs, and a heat detection member having a linear structure. The
(Continued)

battery packs are accommodated in the housing. The battery packs are electrically connectable to each other. The heat detection member has a heat detection function and continuously extends while making thermal contact with a member located near bottom surfaces of the battery packs.

9 Claims, 11 Drawing Sheets

(51) Int. Cl.
| | |
|---|---|
| *H01M 10/48* | (2006.01) |
| *H01M 50/207* | (2021.01) |
| *H01M 50/209* | (2021.01) |
| *H01M 50/213* | (2021.01) |
| *H01M 50/569* | (2021.01) |
| *H02J 7/00* | (2006.01) |

(52) U.S. Cl.
CPC ....... *H01M 10/482* (2013.01); *H01M 50/204* (2021.01); *H01M 50/207* (2021.01); *H01M 50/209* (2021.01); *H01M 50/213* (2021.01); *H01M 50/569* (2021.01); *H02J 7/0013* (2013.01); *H02J 7/00302* (2020.01); *H02J 7/00309* (2020.01); *H02J 7/0031* (2013.01); *H02J 7/0047* (2013.01)

(56) References Cited

FOREIGN PATENT DOCUMENTS

| | | |
|---|---|---|
| EP | 2 439 810 A2 | 4/2012 |
| EP | 3514850 A1 | 7/2019 |
| JP | 5-328630 A | 12/1993 |
| JP | 2011-222409 A | 12/1993 |
| JP | 2005-235611 A | 9/2005 |
| JP | 2009-168720 A | 7/2009 |
| JP | 2012-50258 A | 3/2012 |
| JP | 2012-79547 A | 4/2012 |
| WO | WO 2017/158741 A1 | 9/2017 |
| WO | WO 2018/051393 A1 | 3/2018 |

OTHER PUBLICATIONS

Extended European Search Report issued on Aug. 6, 2024, in corresponding European Application No. 20802652.6, 7 pages.

* cited by examiner

FIG.1
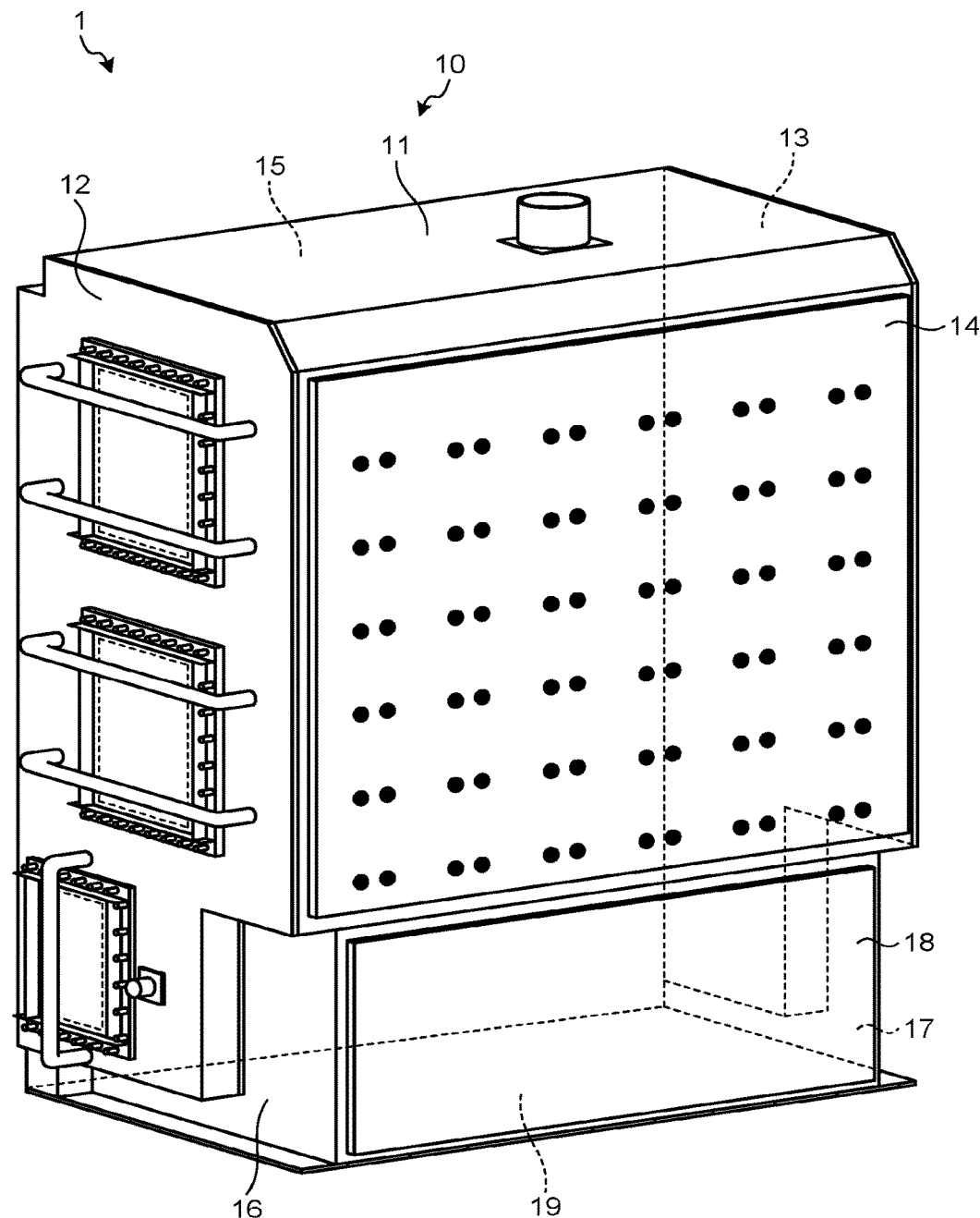
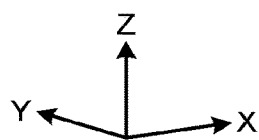

STORAGE BATTERY DEVICE

CROSS-REFERENCE TO RELATED APPLICATIONS

This application is national stage application of International Application No. PCT/JP2020/016944, filed Apr. 17, 2020, which designates the United States, incorporated herein by reference, and which claims the benefit of priority from Japanese Patent Application No. 2019-089261, filed May 9, 2019, the entire contents of each of which are incorporated herein by reference.

FIELD

Embodiments described herein relate generally to a storage battery device.

BACKGROUND

In a storage battery device in which battery packs are accommodated in a housing, the battery packs are electrically connected to each other. It is desirable to improve convenience of the storage battery device.

BRIEF DESCRIPTION OF DRAWINGS

FIG. 1 is a perspective view illustrating an external configuration of a storage battery device according to an embodiment.

DETAILED DESCRIPTION

Figure 2:
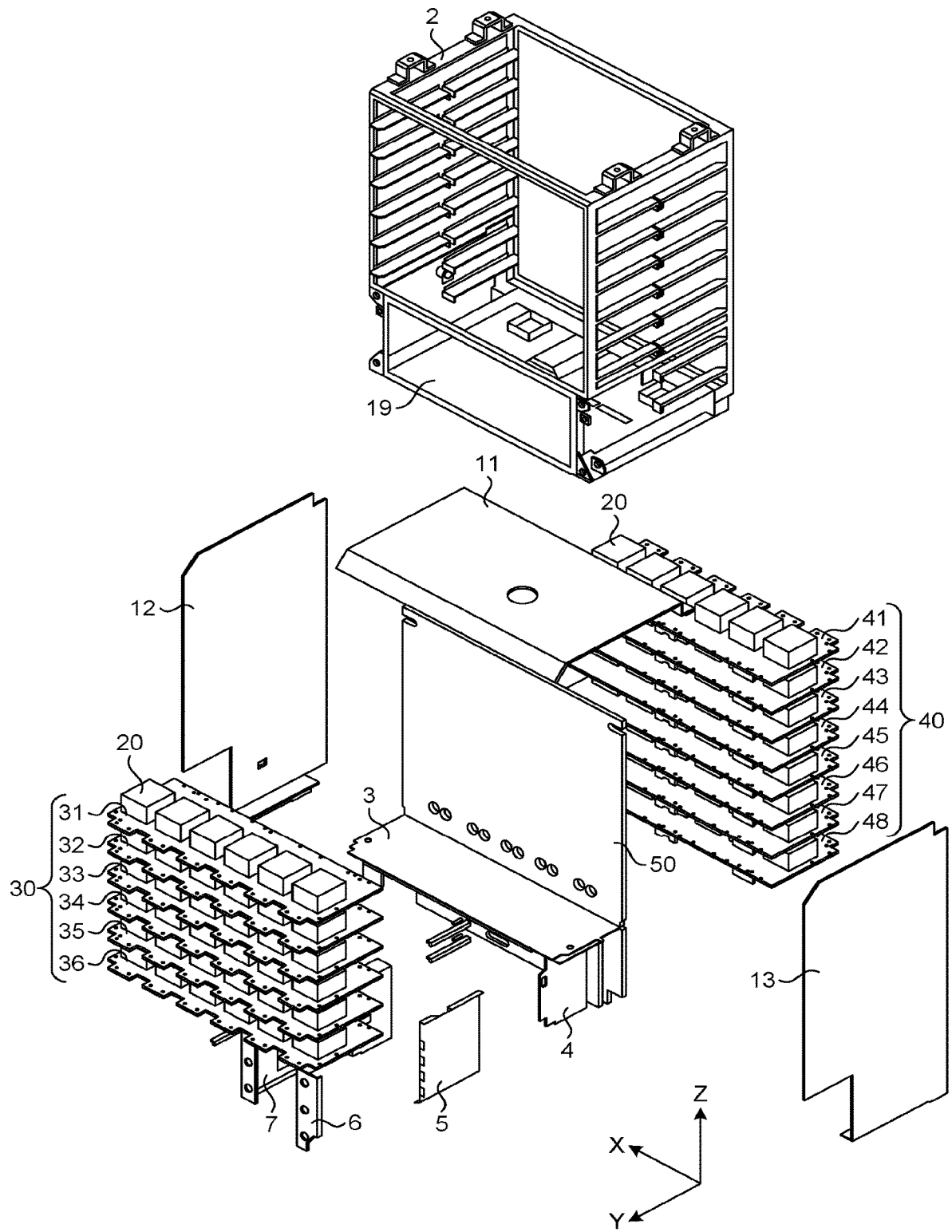
FIG. 2 is an exploded perspective view illustrating an internal configuration of the storage battery device according to the embodiment.

According to one embodiment, a storage battery device including a housing, battery packs, and a line heat detector. The battery packs are accommodated in the housing. The battery packs are electrically connectable to each other. The line heat detector includes a line structure continuously extending while making thermal contact with a member located near bottom surfaces of the battery packs.

Hereinafter, a storage battery device according to an embodiment will be described in detail with reference to the accompanying drawings. Note that the present invention is not limited by the embodiment.

Embodiment

The storage battery device according to the embodiment is used in, for example, a vehicle such as a hybrid locomotive. As a mechanism for improving the fuel consumption of the vehicle, for example, there is a mechanism for driving an internal combustion engine such as a diesel engine in a most efficient region on an efficiency map of an engine, and generating a tread force by power emitted from a storage battery desirably for other speed variation or torque variation. An energy density is low even when the storage battery device is mounted with, for example, a lithium ion battery as compared with a fuel and an engine body of the internal combustion engine such as the diesel engine. For this reason, it is desired to improve the energy density by connecting a large number of battery packs each including battery cells in series or in parallel in a limited in-vehicle outfitting space as an alternative power supply and alternative power and storing the battery packs in a housing at high density.

In a case where the storage battery device stores a large amount of energy, it is necessary for the storage battery device to take measures to reduce the occurrence probability to an acceptable level assuming a hazard that may occur in advance, or to reduce the magnitude of the hazard or the disaster to an acceptable level. In the battery pack, a battery pack case that accommodates battery cells is formed of an insulator such as engineering plastic, but a desired rated insulation voltage tends to exceed 1000 V.

As the hazard to be subjected to the reduction measures, for example, there is a hazard that occurs due to
(1) overcharging on the battery cell from the outside, or
(2) a ground fault from the battery cell to the outside through a dielectric breakdown portion of the battery pack case.

When a battery management system (BMS) that monitors the state of the battery pack is in a sound state, the BMS can detect the factor (1) in cooperation with a cell monitoring unit (CMU) including a voltage sensor and a temperature sensor. However, in a case where the detection is not performed when the BMS and the CMU lose their functions due to a vehicle collision or the like, thermal runaway of the overcharged battery cell may occur, and a fire may occur. Therefore, a detection method in some other system is required for the factor (1).

With regard to the factor (2), when the battery packs are in multiple series in the storage battery device, it is difficult to realize the ground fault detection by an electric circuit. In the storage battery device, since a large number of battery packs are accommodated in a limited space at high density, many ground fault detection circuits are connected to each other at a distance via the battery packs, and there is a possibility that the ground fault cannot be electrically detected. If the number of ground fault detection circuits is increased and a large amount of ground fault detection circuits are installed in a battery circuit, for example, near each battery pack, it is possible to electrically detect the ground fault, but this leads to complication of a system, high cost, and a decrease in energy density in units of devices.

There are, for example, various dielectric breakdown modes for the dielectric breakdown portion of the battery pack case formed of an insulator. However, in a case where the dielectric breakdown partially occurs, it is considered that an electrical impedance incompletely remains, and a short circuit having a current path formed by the remained impedance is generated, so that heat generation continues.

For example, it is considered that overcharging of the battery cell occurs due to an external short circuit or the like, and heat generation during thermal runaway in the battery cell is detected. As a result, it is expected that the sign of the factor (1) can be detected.

In addition, it is considered that the ground fault current continues to flow to the ground potential along a device box or a box frame in a state where there is an impedance due to the dielectric breakdown of the partial insulating material, and heat generated by the loss of the insulating material is detected. As a result, it is expected that the sign of the factor (2) can be detected.

Therefore, in the present embodiment, for detecting the sign of the factor (1) and/or the factor (2) while securing the energy density, the storage battery device is provided with a line heat detector (LHD) that includes a line continuously extending while making thermal contact with a member located near bottom surfaces of the battery packs.

Specifically, a structure is proposed, in which heat generation due to overcharging is detected by the LHD even if an increase in temperature occurs when a short-circuit current flows with the incomplete impedance at the time of the ground fault or even if the BMS and CMU functions are lost. That is, a structure that the LHD is laid near the bottom surface of the battery pack in the device, and a drawing place are proposed. In the storage battery device in which battery packs are accommodated, a shelf board is provided, which includes a heat sink function for transporting and cooling heat generated when dielectric breakdown accompanied by impedance occurs from the battery pack case. The LHD is wired so as to pass through the vicinity of the bottom surface of the battery packs on the shelf board. As a result, it is possible to realize a structure capable of detecting heat when a resin, such as the battery pack case, generates heat as a resistance at the time of dielectric breakdown accompanied by impedance. In this structure, even when an incomplete dielectric breakdown occurs on the module side and the ground fault occurs, the LHD is placed near the bottom surface of the battery pack serving as the current path. Therefore, the sign of the factor (1) and/or the factor (2) can be detected, by the LHD, by detecting heat generation due to the overcharging and/or the ground fault current. As a result, it is possible to take measures to prevent occurrence of hazard caused by the factor (1) and/or the factor (2) in advance, and it is possible to improve convenience of the storage battery device.

More specifically, a storage battery device 1 is accommodated, installed, or loaded under the floor of a storage room or a vehicle body in front of or behind a cab in a vehicle such as a hybrid locomotive or a hybrid train. The storage battery device 1 can be configured in a box shape as illustrated in FIG. 1. FIG. 1 is a perspective view illustrating an external configuration of the storage battery device 1. In FIG. 1, a vertical direction in a posture where the storage battery device 1 is accommodated is defined as a Z direction, and two directions orthogonal to each other in a plane perpendicular to the Z direction are defined as an X direction and a Y direction.

The storage battery device 1 includes a housing 10. The housing 10 has a ceiling plate 11, side plates 12 to 18, and a bottom plate 19. The ceiling plate 11 has a substantially rectangular shape in plan view, and closes the internal space of the storage battery device 1 from the +Z side. The side plates 12 and 16 have substantially L shapes complementary to each other in plan view, and close the internal space of the storage battery device 1 from the −X side. The side plates 13 and 17 have substantially L shapes complementary to each other in plan view, and close the internal space of the storage battery device 1 from the +X side. The side plates 14 and 18 each have a substantially rectangular shape in plan view, and closes the internal space of the storage battery device 1 from the −Y side. The side plate 15 has a substantially rectangular shape in plan view and closes the internal space of the storage battery device 1 from the +Y side. The bottom plate 19 has a substantially rectangular shape in plan view and closes the internal space of the storage battery device 1 from the −Z side.

The inside of the storage battery device 1 can be configured as illustrated in FIG. 2. FIG. 2 is an exploded perspective view illustrating an internal configuration of the storage battery device 1.

The storage battery device 1 includes a frame 2, a partition ceiling plate 3, side plates 4 to 7, battery packs 20, a shelf board group 30, a shelf board group 40, and a partition plate 50.

The frame 2 supports the ceiling plate 11, the side plates 12 to 18, and the bottom plate 19 to form the housing 10. The frame 2 may be configured such that the ceiling plate 11, the side plates 12 to 18, and the bottom plate 19 are fitted into the frame 2, or may be configured such that the ceiling plate 11, the side plates 12 to 18, and the bottom plate 19 are fixed to the frame 2 with screws. The inside of the frame 2 becomes internal space of the storage battery device 1.

The partition ceiling plate 3, the side plate 4, and the side plate 5 divide a space on the +Y side of the partition plate 50 in the internal space of the storage battery device 1 into a first battery room and a supply room. In the space on the +Y side of the partition plate 50, a space on the +Z side of the partition ceiling plate 3 is used as the first battery room, and a space on the −Z side of the partition ceiling plate 3 is used as the supply room. In the supply room, a main circuit (not illustrated) that manages the storage battery device 1 is accommodated. The side plate 6 and the side plate 7 are each a side plate including outlets of pipes to the main circuit. A space on the −Y side of the partition plate 50 is used as a second battery room.

The battery packs 20 are accommodated in the housing 10. The battery packs 20 are accommodated in the first battery room and the second battery room in the internal space of the storage battery device 1. The battery packs 20 can be electrically connected to each other. By connecting a series connection of k (for example, k=28) battery packs 20 in m rows (for example, m=3) in parallel, k×m battery packs 20 can be electrically connected to each other between a positive-side output node N (+) and a negative-side output node N (−) (see FIG. 6).

The shelf board group 30 is accommodated in the first battery room. The shelf board group 30 includes shelf boards 31 to 36. The shelf boards 31 to 36 extend in the XY direction with the X direction as a longitudinal direction, and are arranged apart from each other in the Z direction. The side surface on the −Y side of each of the shelf boards 31 to 36 is supported by the surface on the +Y side of the partition plate 50.

In each of the shelf boards 31 to 36, the battery packs 20 are placed on a +Z-side face (surface). In FIG. 2, an example is illustrated, in which six battery packs 20 are placed on the surface of each of the shelf boards 31 to 36. On the surfaces of the shelf boards 31 to 36, the battery packs 20 are arranged while being separated from each other in the X direction. The battery packs 20 arranged on each of the shelf boards 31 to 36 can be electrically connected to each other by a bus bar and/or a conductive wire (not illustrated).

Each of the shelf boards 31 to 36 may be formed of a material as a main component with a metal or the like having thermal conductivity. The bottom surfaces of the battery packs 20 arranged on each of the shelf boards 31 to 36 make thermal contact with the surfaces of the shelf boards 31 to 36. Each of the shelf boards 31 to 36 can release the heat received from the battery pack 20 on the side of the surface to the internal space of the storage battery device 1 from the back surface thereof, and can function as a heat sink.

The shelf board group 40 is accommodated in the second battery room. The shelf board group 40 includes shelf boards 41 to 48. The number of the shelf boards 41 to 48 included in the shelf board group 40 is larger than the number of the shelf boards 31 to 36 included in the shelf board group 30. The shelf boards 41 to 48 extend in the XY direction with the X direction as a longitudinal direction, and are arranged apart from each other in the Z direction. The side surface on the +Y side of each of the shelf boards 41 to 48 is supported by the surface on the −Y side of the partition plate 50.

In each of the shelf boards 41 to 48, the battery packs 20 are placed on a +Z-side surface (surface). In FIG. 2, an example is illustrated, in which six battery packs 20 are placed on the surface of each of the shelf boards 41 to 48. On the surfaces of the shelf boards 41 to 48, the battery packs 20 are arranged while being separated from each other in the X direction. The battery packs 20 arranged on each of the shelf boards 41 to 48 can be electrically connected to each other by a bus bar and/or a conductive wire (not illustrated).

Each of the shelf boards 41 to 48 can be formed of a material with a metal or the like having thermal conductivity as a main component. The bottom surfaces of the battery packs 20 arranged on each of the shelf boards 41 to 48 make thermal contact with the surfaces of the shelf boards. Each of the shelf boards 41 to 48 can release the heat received from the battery pack 20 on the side of the surface to the internal space of the storage battery device 1 from the back surface thereof, and can function as a heat sink.

The partition plate 50 extends in the XZ direction and partitions the internal space of the storage battery device 1 into the first battery room, the supply room, and the second battery room. The partition plate 50 is located between the shelf board group 30 and the shelf board group 40 in the Y direction.

The partition plate 50 supports each of the shelf boards 31 to 36 included in the shelf board group 30 on the +Y-side surface. The side surface on the −Y side of each of the shelf boards 31 to 36 makes contact with the surface on the +Y side of the partition plate 50. The side surface on the −Y side of each of the shelf boards 31 to 36 may be configured to be fitted into the surface on the +Y side of the partition plate 50, or may be configured to be fixed to the surface on the +Y side of the partition plate 50 with screws.

The partition plate 50 supports each of the shelf boards 41 to 48 included in the shelf board group 40 on the −Y-side surface. The side surface on the +Y side of each of the shelf boards 41 to 48 makes contact with the surface on the −Y side of the partition plate 50. The side surface on the +Y side of each of the shelf boards 41 to 48 may be configured to be fitted into the surface on the −Y side of the partition plate 50, or may be configured to be fixed to the surface on the −Y side of the partition plate 50 with screws.

Figure 3:
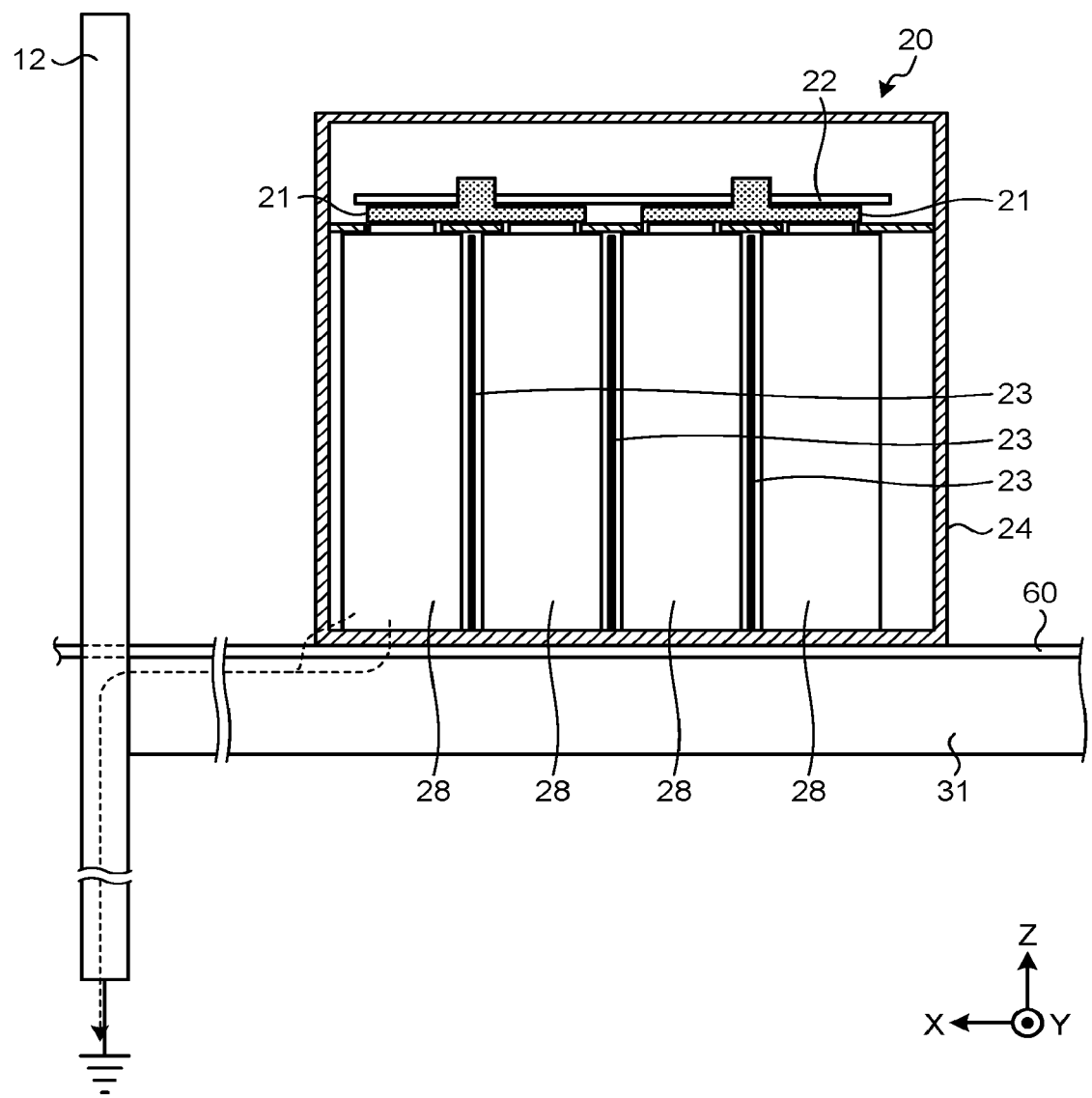
FIG. 3 is a cross-sectional view illustrating configurations of a battery pack, a shelf board, and a line heat detector in the embodiment.

As illustrated in FIG. 2, in the storage battery device 1, the battery packs 20 are accommodated at high density. Each battery pack 20 can be configured as illustrated in FIG. 3. Each battery pack 20 includes a bus bar 21, a substrate 22, a separator 23, a battery pack case 24, and a plurality of battery cells 28. The plurality of battery cells 28 is accommodated in the battery pack case 24. The battery pack case 24 may be formed of a material with an insulator (insulating resin) such as engineering plastic as a main component. Each battery cell 28 has a square can shape or a cylindrical can shape. The plurality of battery cells 28 is insulated on the bottom surface of the battery pack case 24 via the separator 23. The separator 23 is formed of a material with an insulator (insulating resin) as a main component. Two adjacent ones of the plurality of battery cells 28 have a positive electrode terminal and a negative electrode terminal on an upper portion thereof, and are electrically connected to each other by the bus bar 21. Series and parallel connections of the plurality of battery cells 28 are configured by the combination and the configuration of the bus bars 21. Moreover, a sensor (for example, a voltage sensor or a temperature sensor such as a thermistor) and a cell monitoring unit (CMU) are mounted on the substrate 22, and the sensor detects a voltage or a cell temperature under control of the CMU.

The bottom surface of the battery pack case 24 configured as described above is installed on, for example, the shelf board 31 via a heat transfer layer (not illustrated). The heat transfer layer is formed of a material with an insulator (for example, an insulating resin such as a silicone resin), such as a gap filler or a compound, which has flexibility to fill a gap, is compressible, and has increased thermal conductivity to 1 [W/m·K] or more as a main component. The heat transfer layer is applied to or attached to the surface of the shelf board 31 to bring the battery pack 20 and the shelf board 31 into close contact with each other. The shelf board 31 and the battery pack case 24 can be fixed by bolt fastening or the like. In addition, the shelf board 31 is physically connected to the grounded side plate 12 and makes thermal contact with the side plate 12.

When such battery packs 20 are provided on each of the shelf boards, dozens or more battery packs 20 are accommodated at high density in the internal space of the storage battery device 1. In the storage battery device 1, in which the energy bodies are accommodated at high density, a structure taking a possible hazard into consideration in advance is desired.

As to the possible hazard, for example, it is considered that a small crack is incompletely generated in the battery pack case 24 or the like, or dielectric breakdown or the like gradually starts from the bottom surface due to deterioration of the battery pack case 24 or the heat transfer layer (deterioration of the insulating material). In this case, a ground fault may occur in which a short-circuit current flows to the grounded side plate 12 through the bottom surface of the battery pack case 24 and the shelf board 31 for some period of time while the insulating material maintains some impedance. A current path when the ground fault occurs is indicated by a dotted arrow in FIG. 3, for example.

On the other hand, as illustrated in FIG. 3, there is a line heat detector (LHD) 60 as a heat detection member having a heat detection function. The LHD 60 is relatively inexpensive and has a linear structure in which a detection temperature is about 70° C. to 100° C. The ground fault is detected by laying the LHD 60 around the bottom surface of the battery pack 20 on the surface of the shelf board 31. FIG. 3 is a cross-sectional view illustrating configurations of the battery pack 20, the shelf board 31, and the line heat detector (LHD) 60.

For the hazard as described above, it is considered that a decrease in capacity is detected by the voltage sensor provided in the battery pack from a battery management system (BMS). However, in the present embodiment, a robust protection system is proposed for the entire storage battery device 1 by detection from another system of the LHD 60. The LHD 60 can be configured to detect, for example, a temperature of 75° C. to 90° C. before thermal runaway occurs on the assumption that, for example, the battery cell 28 is no longer protected from an overcharged state due to an external short circuit or the like caused by some factor, and thereby the temperature rises. With this configuration, a sign of the occurrence of a ground fault can be detected by the LHD 60.

Figure 6:
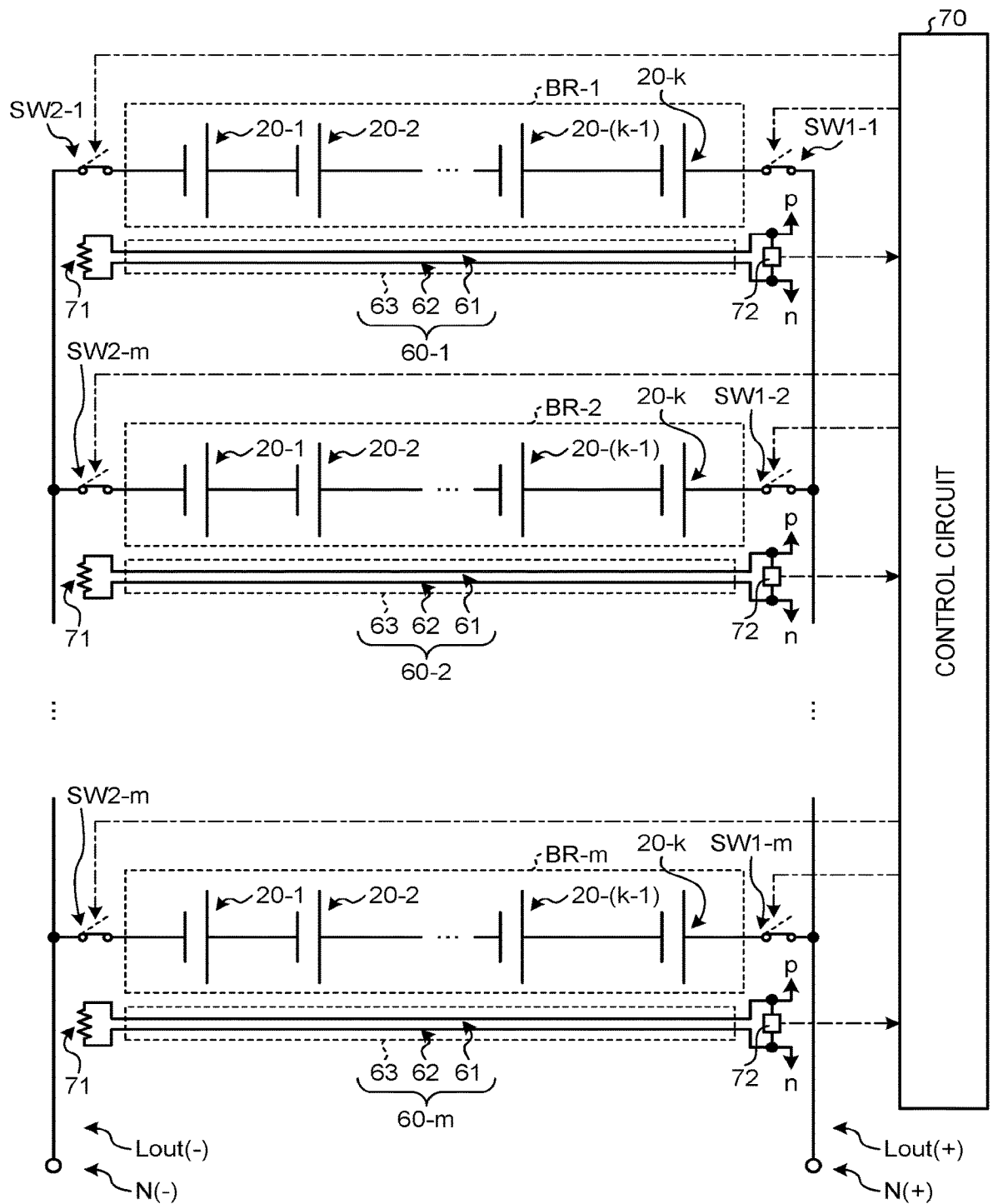
FIG. 6 is a circuit diagram illustrating configurations of a branch, a line heat detector, and a control circuit in a second modification of the embodiment.

The LHD 60 includes two signal lines 61 and 62, and an insulating coating 63 (see FIG. 6). One ends of the two signal lines 61 and 62 are electrically connected to each other via a resistive element 71, and portions between one ends and the other ends are electrically insulated from each other by the insulating coating 63. The insulating coating 63 can be formed of a material having, as a main component, a heat-meltable resin having a melting temperature corresponding to the detection temperature (for example, 70° C. to 90° C.). A bias (voltage or current) is applied to the two signal lines 61 and 62 from the other end side. A potential difference at the other ends of the two signal lines 61 and 62 is measured by a voltmeter 72, and a measurement result is monitored by a control circuit 70 (for example, part of the main circuit). Between the two signal lines 61 and 62, when, for example, the ambient temperature reaches the detection temperature (for example, 70° C. to 100° C.), the insulating coating 63 melts, and the two signal lines 61 and 62 are short-circuited and energized. In response to this interaction, the potential difference between the two signal lines 61 and 62 changes (for example, changes to be lower than a threshold). Thus, it can be detected that the ambient temperature has increased to reach the detection temperature (for example, 70° C. to 90° C.). As a result, for example, when the LHD 60 is provided near the place where the short-circuit current flows, it is possible to detect a temperature increase due to heat generation near the dielectric breakdown place of the battery pack 20, and it is also possible to detect a temperature increase due to heat generation associated with the ground fault current.

Figure 4:
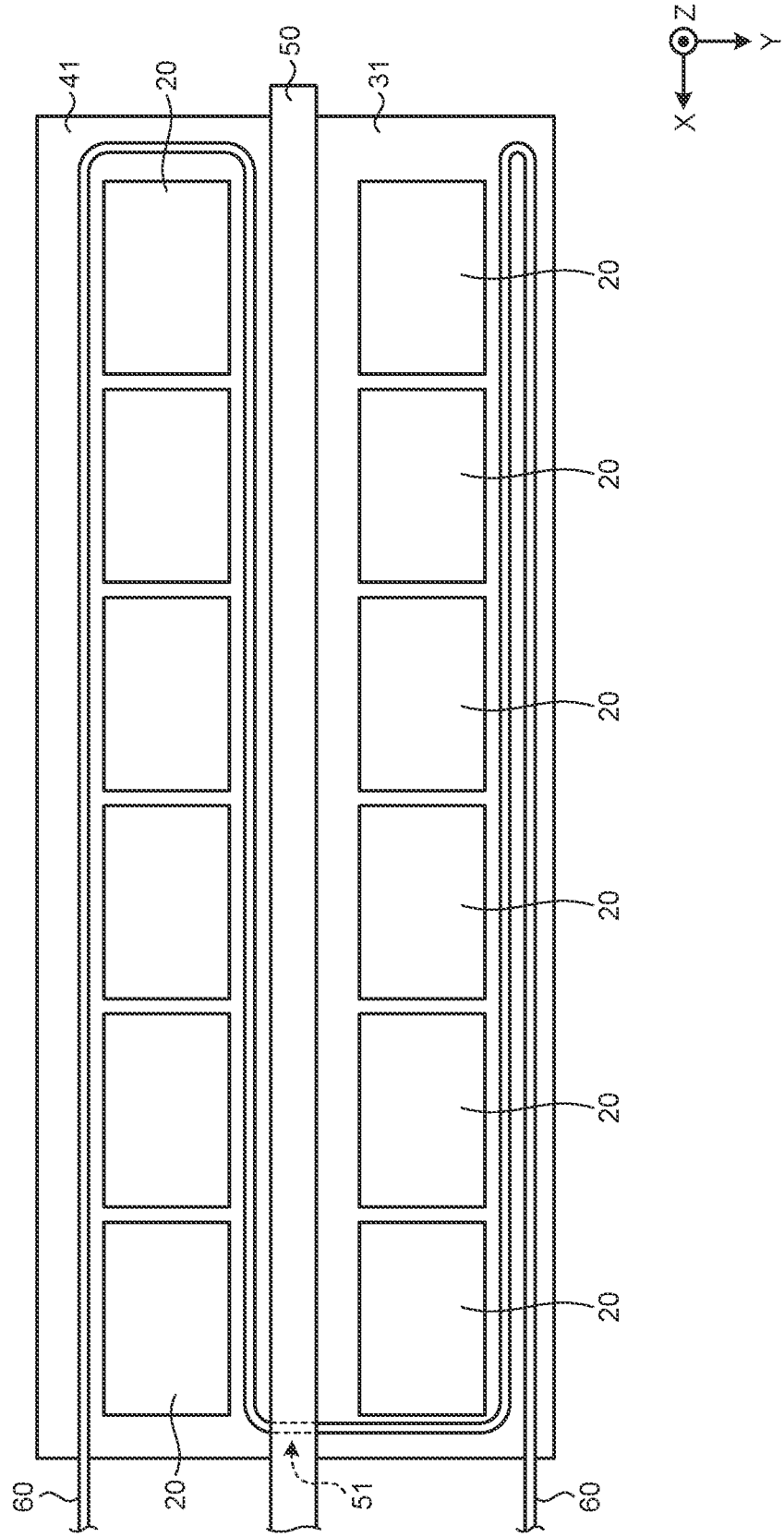
FIG. 4 is a plan view illustrating configurations of a battery pack, a shelf board, and a line heat detector in the embodiment.

When the short-circuit current flows in a state where the impedance remains in the current path as indicated by the dotted arrow in FIG. 3, the temperature of the periphery thereof becomes 70° C. to 90° C. which the LHD 60 can detect. Therefore, the LHD 60 is laid around the bottom surface of the battery pack 20 as illustrated in FIG. 4. FIG. 4 is a plan view illustrating configurations of the battery pack 20, the shelf boards 31 and 41, and a line heat detector (LHD) 60.

The LHD 60 includes a line that continuously extends while making thermal contact with members (shelf boards 31 and 41) near the bottom surface of the battery pack. The partition plate 50 is placed between the shelf board 31 and the shelf board 41 in the XY plan view and makes contact with the side surfaces of the shelf boards 31 and 41. The LHD 60 extends over the shelf board 31 and the shelf board 41 through the partition plate 50. The LHD 60 continuously extends near the battery packs 20 on the surface of the shelf board 31, then extends to the shelf board 41 through a through hole 51, and continuously extends near the battery packs 20 on the surface of the shelf board 41. The through hole 51 connects the +Y-side surface and the −Y-side surface of the partition plate 50. As a result, it is possible to collectively detect a sign of thermal runaway due to overcharging and/or a sign of a ground fault in the battery packs placed at the same Z height.

As described above, in the present embodiment, the storage battery device 1 is provided with the line heat detector (LHD) 60 that includes a line continuously extending while making thermal contact with a member located near the bottom surfaces of the battery packs 20. For example, the LHD 60 extends over the shelf board 31 and the shelf board 41 through the partition plate 50, and continuously extends near the battery packs 20 on the surfaces of the shelf boards 31 and 41. With this configuration, it is possible to detect the temperature of the battery pack 20 in which thermal runaway is about to start, and it is possible to detect an increase in ambient temperature due to the ground fault current. In addition, as compared with a case where a detection circuit is added for each battery pack 20, a space for detection can be greatly saved, so that an arrangement space of the battery packs 20 can be easily secured. As a result, it is possible to detect a sign of thermal runaway due to overcharging and/or a sign of a ground fault while securing energy density. Therefore, it is possible to take measures to prevent occurrence of hazard caused by overcharging and/or a ground fault in advance, and it is possible to improve convenience of the storage battery device 1.

Moreover, in the present embodiment, the detection temperature (for example, 70° C. to 90° C.) of the LHD 60 is lower than the temperature causing fire occurrence in the storage battery device 1. As a result, the LHD 60 can detect a sign of thermal runaway of the storage battery due to overcharging and/or a sign of a ground fault, and can detect a sign of a fire. Therefore, it is possible to take measures to prevent the occurrence of the fire in advance, and it is also possible to improve convenience of the storage battery device 1 from this viewpoint.

Note that a laying structure of the LHD 60 illustrated in FIG. 4 may be provided for each set (a set of shelf boards 31 and 41, a set of shelf boards 32 and 42, . . . , and a set of shelf boards 36 and 46) of the shelf boards having the same Z height. In this case, the LHD 60 may be laid in a continuous shape on each of the shelf boards 47 and 48. With this configuration, a sign of thermal runaway due to overcharging of the battery pack 20 and/or a sign of a ground fault can be detected for each Z height.

Figure 5:
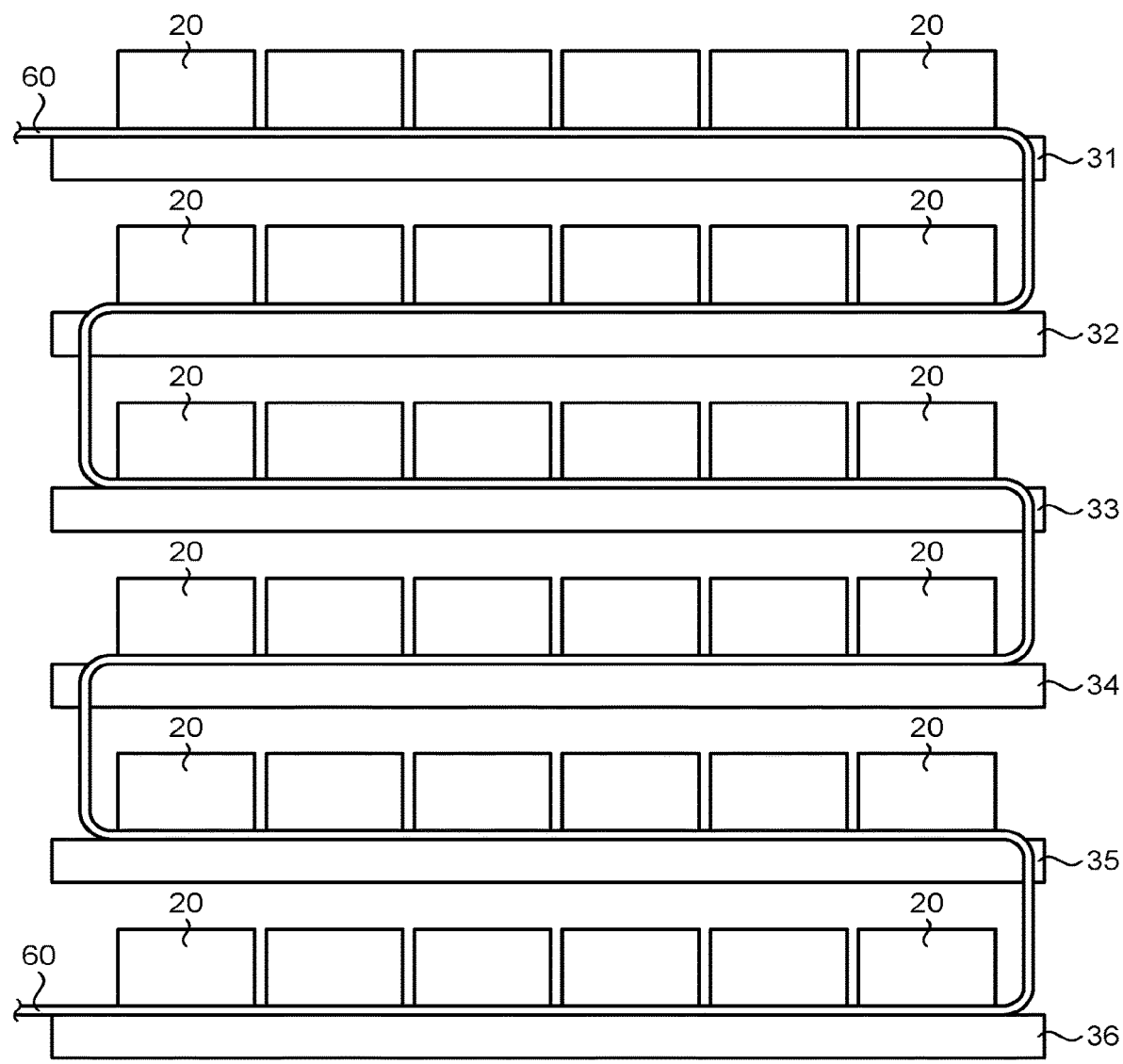
FIG. 5 is a side view illustrating configurations of a battery pack, a shelf board, and a line heat detector in a first modification of the embodiment.

Alternatively, the laying structure of the LHD 60 may be provided for each shelf board at the same Y position, that is, for each of the shelf board groups 30 and 40. The LHD 60 may be laid as illustrated in FIG. 5. FIG. 5 is a side view illustrating configurations of a battery pack 20, shelf boards 31 to 36, and a line heat detector (LHD) 60 according to a first modification of the embodiment. For example, the LHD 60 extends over the shelf boards 31 to 36 included in the shelf board group 30, and continuously extends near the battery packs 20 on the surface of each of the shelf boards 31 to 36. That is, the LHD 60 extends in the −X direction near the battery packs 20 on the surface of the shelf board 31, and extends from the shelf board 31 to the shelf board 32 in the −Z direction. The LHD 60 extends in the +X direction near the battery packs 20 on the surface of the shelf board 32, and extends from the shelf board 32 to the shelf board 33 in the −Z direction. The LHD 60 extends in the −X direction near the battery packs 20 on the surface of the shelf board 33, and extends from the shelf board 33 to the shelf board 34 in the −Z direction. The LHD 60 extends in the +X direction near the battery packs 20 on the surface of the shelf board 34, and extends from the shelf board 34 to the shelf board 35 in the −Z direction. The LHD 60 extends in the −X direction near the battery packs 20 on the surface of the shelf board 35, and extends from the shelf board 35 to the shelf board 36 in the −Z direction. The LHD 60 extends in the +X direction near the battery packs 20 on the surface of the shelf board 36. Although not illustrated, similarly, the LHD 60 extends over the shelf boards 41 to 48 included in the shelf board group 40, and continuously extends near the battery packs 20 on the surface of each of the shelf boards 41 to 48. As a result, a sign of thermal runaway due to overcharging of the battery pack 20 and/or a sign of a ground fault can be detected for each Y position.

Alternatively, a laying structure of the LHD 60 illustrated in FIG. 4 and a laying structure of the LHD 60 illustrated in FIG. 5 may be combined. For example, in the LHD 60, the shelf boards 31 and 41 may be laid in the same manner as the laying structure illustrated in FIG. 4, the shelf boards 32 to 36 may be laid in the same manner as the laying structure illustrated in FIG. 5, and the shelf boards 42 to 48 may be laid in the same manner as the laying structure illustrated in FIG. 5.

Alternatively, when the battery packs 20 are grouped into branches BR-1 to BR-m, a laying structure of LHDs 60-1 to 60-m may be provided for each branch BR. The branch BR may be an electrical minimum separable unit as viewed from the storage battery device 1 in series or parallel connection of the battery packs 20. For example, as illustrated in FIG. 6, each series connection of k battery packs 20-1 to 20-k is handled as one branch, and switches SW1 and SW2 are electrically connected between both ends thereof and output lines Lout (+) and Lout (−).

In a circuit configuration illustrated in FIG. 6, when any battery pack 20 in the branch BR is out of order, the battery pack is electrically disconnected from the storage battery device 1 in unit of branch BR. In this case, the LHDs 60-1 to 60-m may be prepared for each branch BR. The LHDs 60-1 to 60-m correspond to the branches BR-1 to BR-m, respectively. Each LHD 60 has two signal lines 61 and 62 and an insulating coating 63. One ends of the two signal lines 61 and 62 are electrically connected to each other via a resistive element 71, and portions between one ends and the other ends are electrically insulated from each other by the insulating coating 63. The insulating coating 63 can be formed of a material having, as a main component, a heat-meltable resin having a melting temperature corresponding to the detection temperature (for example, 70° C. to 90° C.). A bias (voltage or current) is applied to the two signal lines 61 and 62 from the other ends side. A potential difference at the other ends of the two signal lines 61 and 62 is measured by a voltmeter 72, and a measurement result is monitored by a control circuit 70 (for example, part of a main circuit). When a monitoring result indicates that the battery pack 20 in a branch BR has broken, the control circuit 70 causes the switches SW1 and SW2 at both ends of the branch BR including the broken battery pack 20 to shift from an ON state to an OFF state (that is, shift from a state indicated by a solid line to a state indicated by a dotted line in FIG. 6). As a result, the branch BR including the broken battery pack 20 is electrically disconnected from the storage battery device 1.

Figure 7:
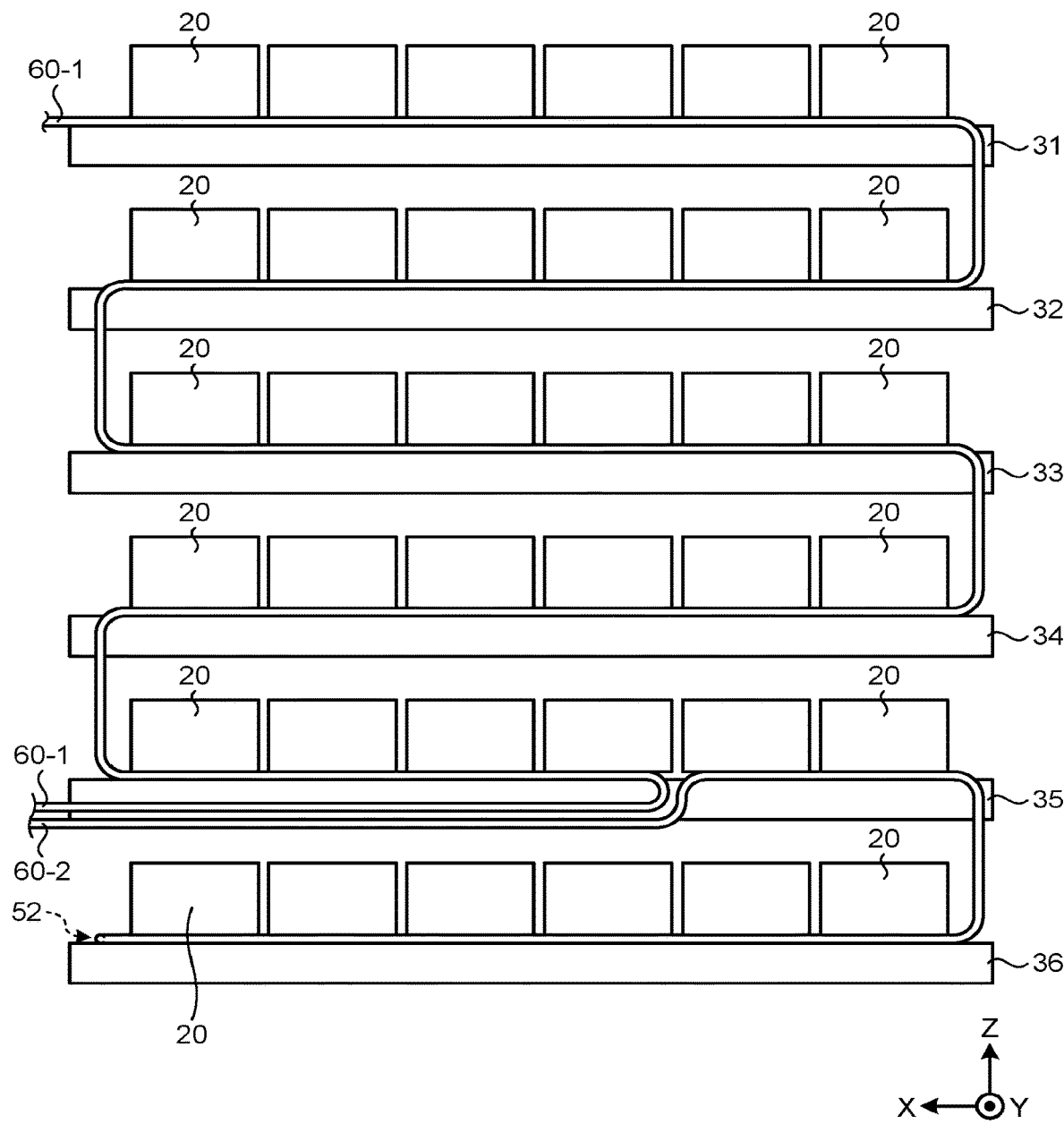
FIG. 7 is a side view illustrating configurations of a battery pack, a shelf board, and a line heat detector in the second modification of the embodiment.
Figure 8:
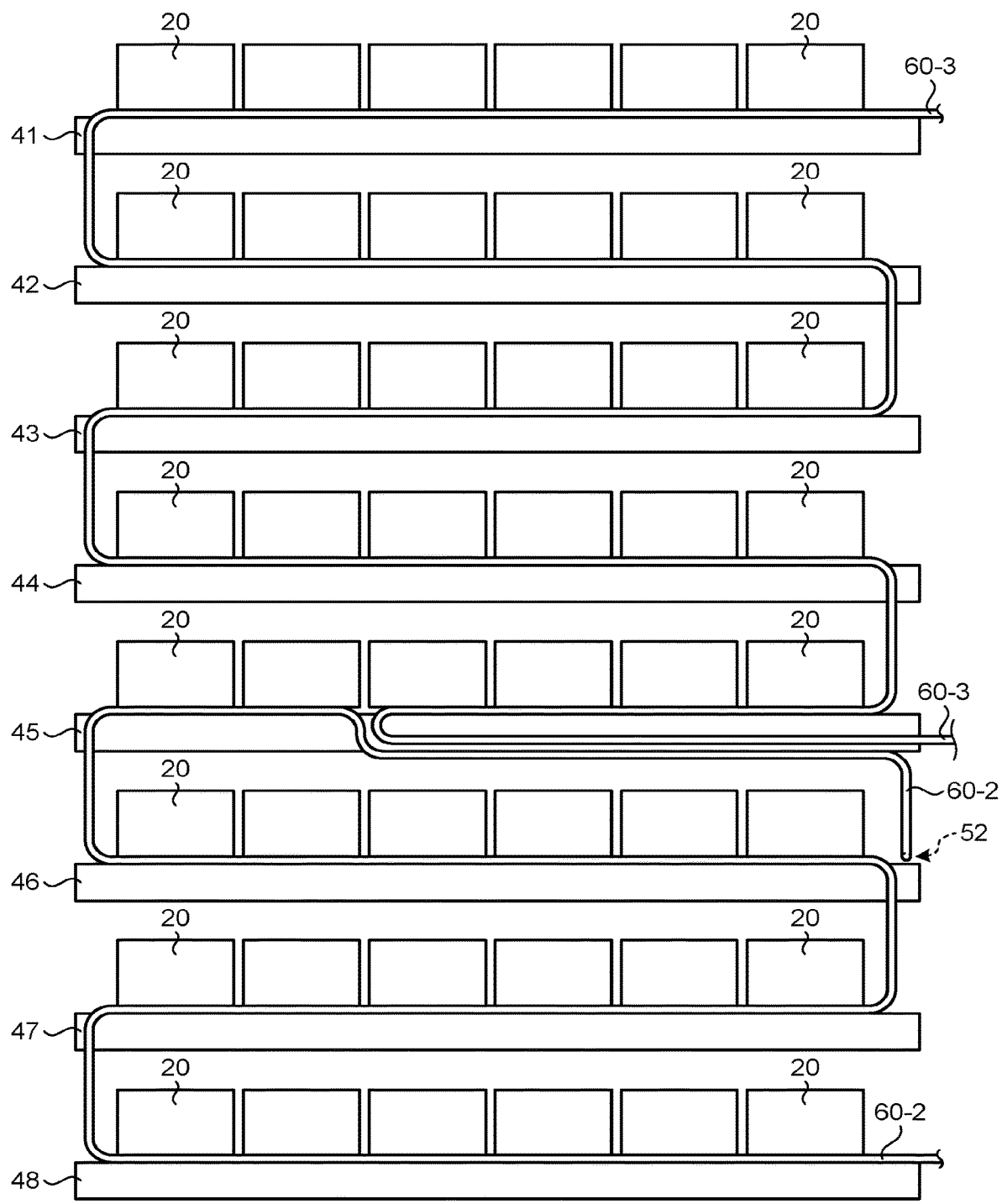
FIG. 8 is a side view illustrating configurations of a battery pack, a shelf board, and a line heat detector in the second modification of the embodiment.

For example, in a case of k=28 and m=3, the LHDs 60-1 to 60-3 can be laid as illustrated in FIGS. 7 and 8. The LHD 60-1 continuously extends while making thermal contact with members near the battery packs 20 in the branch BR-1. That is, the LHD 60-1 extends in the −X direction near the six battery packs 20 on the surface of the shelf board 31, and extends from the shelf board 31 to the shelf board 32 in the −Z direction. The LHD 60-1 extends in the +X direction near the six battery packs 20 on the surface of the shelf board 32, and extends from the shelf board 32 to the shelf board 33 in the −Z direction. The LHD 60-1 extends in the −X direction near the six battery packs 20 on the surface of the shelf board 33, and extends from the shelf board 33 to the shelf board 34 in the −Z direction. The LHD 60-1 extends in the +X direction near the six battery packs 20 on the surface of the shelf board 34, and extends from the shelf board 34 to the shelf board 35 in the −Z direction. The LHD 60-1 extends in the −X direction near the four battery packs 20 on the surface of the shelf board 35.

The LHD 60-2 continuously extends while making thermal contact with members near the battery packs 20 in the branch BR-2. That is, the LHD 60-2 extends in the −X direction near the two battery packs 20 on the surface of the shelf board 35, and extends from the shelf board 35 to the shelf board 36 in the −Z direction. The LHD 60-2 extends in the +X direction near the six battery packs 20 on the surface of the shelf board 36, and extends to the shelf board 45 through a through hole 52 in the partition plate 50. The LHD 60-2 extends in the −X direction near the two battery packs 20 on the surface of the shelf board 45, and extends from the shelf board 45 to the shelf board 46 in the −Z direction. The LHD 60-2 extends in the +X direction near the six battery packs 20 on the surface of the shelf board 46, and extends from the shelf board 46 to the shelf board 47 in the −Z direction. The LHD 60-2 extends in the −X direction near the six battery packs 20 on the surface of the shelf board 47, and extends from the shelf board 47 to the shelf board 48 in the −Z direction. The LHD 60-2 extends in the +X direction near the six battery packs 20 on the surface of the shelf board 48.

The LHD 60-3 continuously extends while making thermal contact with members near the battery packs 20 in the branch BR-3. That is, the LHD 60-3 extends in the −X direction near the six battery packs 20 on the surface of the shelf board 41, and extends from the shelf board 41 to the shelf board 42 in the −Z direction. The LHD 60-3 extends in the +X direction near the six battery packs 20 on the surface of the shelf board 42, and extends from the shelf board 42 to the shelf board 43 in the −Z direction. The LHD 60-3 extends in the −X direction near the six battery packs 20 on the surface of the shelf board 43, and extends from the shelf board 43 to the shelf board 44 in the −Z direction. The LHD 60-3 extends in the +X direction near the six battery packs 20 on the surface of the shelf board 44, and extends from the shelf board 44 to the shelf board 45 in the −Z direction. The LHD 60-3 extends in the −X direction near the four battery packs 20 on the surface of the shelf board 45.

As described above, the LHD 60 is prepared for each branch BR and individually monitored by the control circuit 70. As a result, it is possible to detect a sign of thermal runaway due to overcharging of the battery pack 20 and/or a sign of a ground fault for each branch BR, and it is possible to take measures to previously prevent occurrence of the hazard caused by the overcharging and/or the ground fault for each branch BR. For example, the branch BR including the battery pack 20 indicating the sign of the overcharging and/or the ground fault can be electrically disconnected from the output lines Lout (+) and Lout (−).

Figure 9:
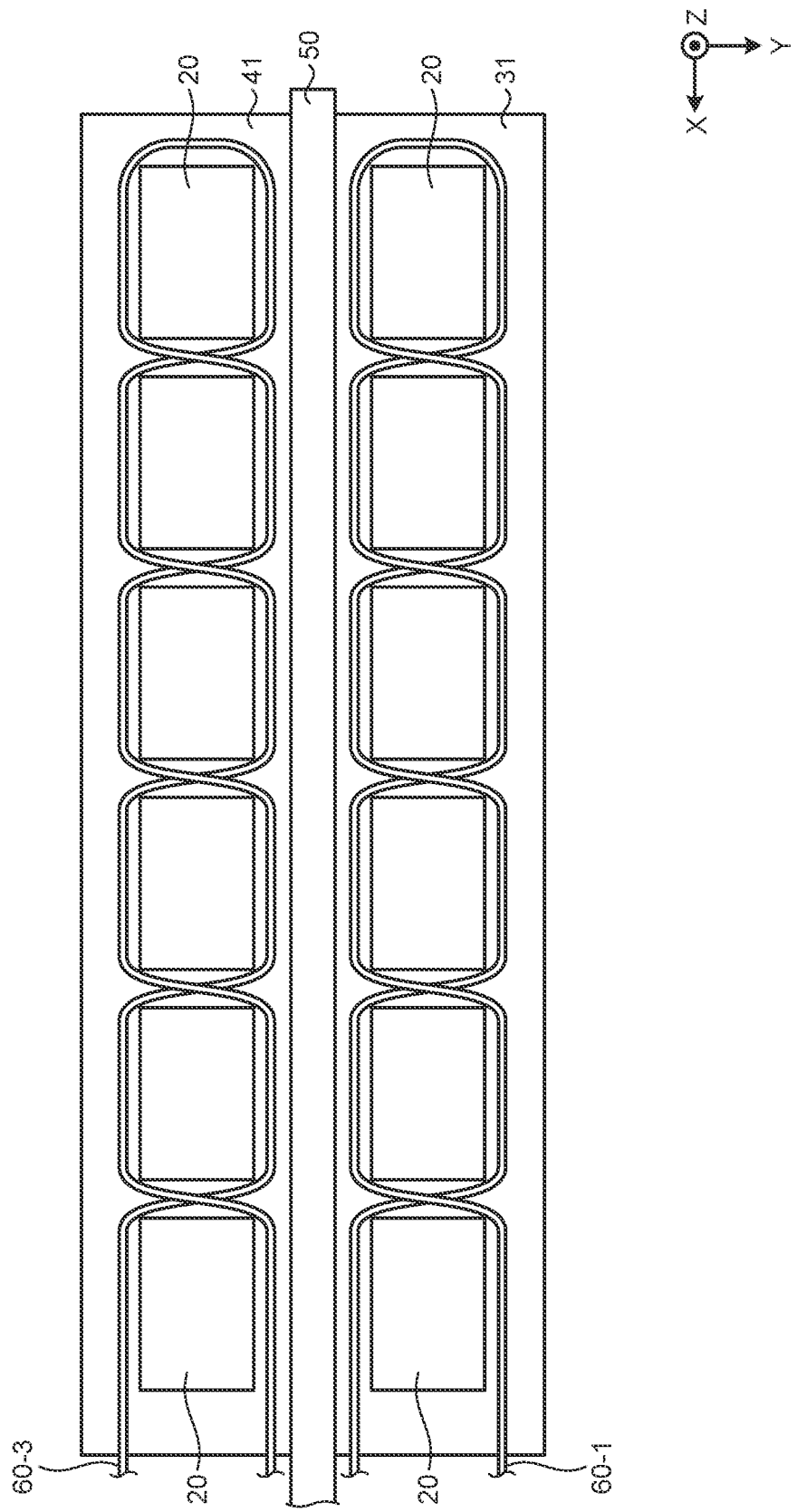
FIG. 9 is a plan view illustrating configurations of a battery pack, a shelf board, and a line heat detector in a third modification of the embodiment.

Alternatively, when the laying structure of the LHDs 60-1 to 60-m is provided for each branch BR, each LHD 60 may continuously extend so as to surround each battery pack 20 in the XY plan view. The LHD 60 may be laid as illustrated in FIG. 9. FIG. 9 is a plan view illustrating configurations of a battery pack 20, shelf boards 31 and 41, and line heat detectors (LHDs) 60-1 and 60-3 according to a third modification of the embodiment.

The LHD 60-1 corresponds to the branch BR-1 (see FIG. 6). On the surface of the shelf board 31, the LHD 60-1 reciprocates between one end and the other end of the shelf board 31 while meandering between the battery packs 20 and continuously extends. That is, the LHD 60-1 extends in the −X direction on the +Y side of the first battery pack 20, extends in the −Y direction between the battery packs 20, extends in the −X direction on the −Y side of the second battery pack 20, and extends in the +Y direction between the battery packs 20. The LHD 60-1 extends in the −X direction on the +Y side of the third battery pack 20, extends in the −Y direction between the battery packs 20, extends in the −X direction on the −Y side of the fourth battery pack 20, and extends in the +Y direction between the battery packs 20. The LHD 60-1 extends in the −X direction on the +Y side of the fifth battery pack 20, extends in the −Y direction between the battery packs 20, extends in the −X direction on the −Y side of the sixth battery pack 20, and extends in the +Y direction between the battery packs 20. The LHD 60-1 extends in the +X direction on the +Y side of the sixth battery pack 20, extends in the −Y direction between the battery packs 20, extends in the +X direction on the −Y side of the fifth battery pack 20, and extends in the +Y direction between the battery packs 20. The LHD 60-1 extends in the +X direction on the +Y side of the fourth battery pack 20, extends in the −Y direction between the battery packs 20, extends in the +X direction on the −Y side of the third battery pack 20, and extends in the +Y direction between the battery packs 20. The LHD 60-1 extends in the +X direction on the +Y side of the second battery pack 20, extends in the −Y direction between the battery packs 20, and extends in the +X direction on the −Y side of the first battery pack 20. Although not illustrated, similarly, on the surface of each of the shelf boards 32 to 35, the LHD 60-1 reciprocates between one end and the other end of the shelf board 31 while meandering between the battery packs 20 (for example, the shelf boards 32 to 34 have six battery packs 20, and the shelf board 35 has four battery packs 20) and continuously extends. The LHD 60-1 may be laid between the shelf boards, as in FIG. 7.

The LHD 60-3 corresponds to the branch BR-3 (see FIG. 6), and on the surface of the shelf board 41, the LHD 60-3 reciprocates between one end and the other end of the shelf board 41 while meandering between the battery packs 20 and continuously extends. That is, the LHD 60-3 extends in the −X direction on the +Y side of the first battery pack 20, extends in the −Y direction between the battery packs 20, extends in the −X direction on the −Y side of the second battery pack 20, and extends in the +Y direction between the battery packs 20. The LHD 60-3 extends in the −X direction on the +Y side of the third battery pack 20, extends in the −Y direction between the battery packs 20, extends in the −X direction on the −Y side of the fourth battery pack 20, and extends in the +Y direction between the battery packs 20. The LHD 60-3 extends in the −X direction on the +Y side of the fifth battery pack 20, extends in the −Y direction between the battery packs 20, extends in the −X direction on the −Y side of the sixth battery pack 20, and extends in the +Y direction between the battery packs 20. The LHD 60-3 extends in the +X direction on the +Y side of the sixth battery packs 20, extends in the −Y direction between the battery packs 20, extends in the +X direction on the −Y side of the fifth battery pack 20, and extends in the +Y direction between the battery packs 20. The LHD 60-3 extends in the +X direction on the +Y side of the fourth battery pack 20, extends in the −Y direction between the battery packs 20, extends in the +X direction on the −Y side of the third battery pack 20, and extends in the +Y direction between the battery packs 20. The LHD 60-3 extends in the +X direction on the +Y side of the second battery pack 20, extends in the −Y direction between the battery packs 20, and extends in the +X direction on the −Y side of the first battery pack 20. Although not illustrated, similarly, on the surface of each of the shelf boards 42 to 45, the LHD 60-3 reciprocates between one end and the other end of the shelf board 41 while meandering between the battery packs 20 (for example, the shelf boards 42 to 44 have six battery packs 20, and the shelf board 45 has four battery packs 20) and continuously extends. The LHD 60-3 may be laid between the shelf boards, as in FIG. 8.

Even with such a configuration, it is possible to detect a sign of thermal runaway due to overcharging of the battery pack 20 and/or a sign of a ground fault for each branch BR, and it is possible to take measures to previously prevent occurrence of the hazard caused by the overcharging and/or the ground fault for each branch BR.

Figure 10:
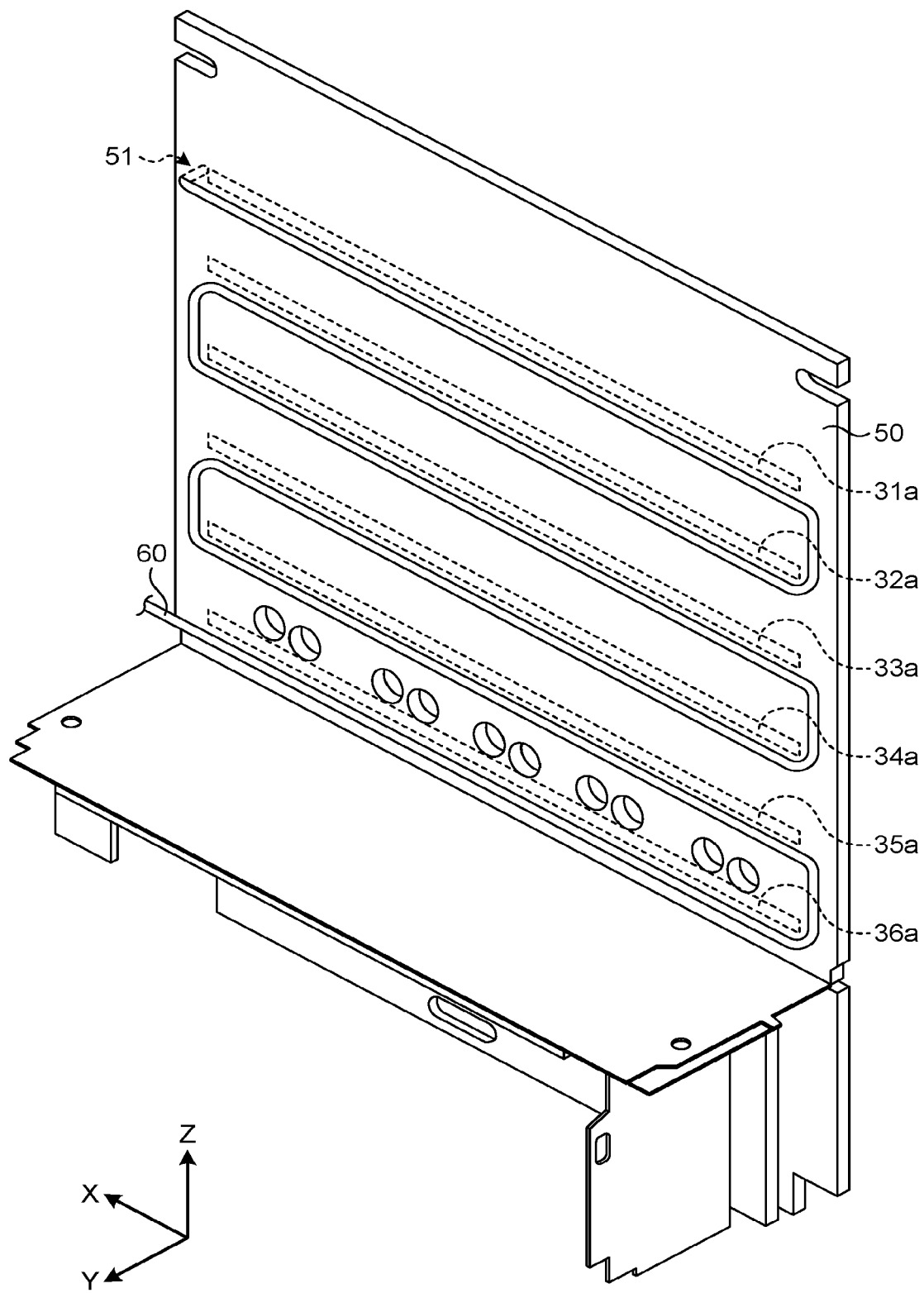
FIG. 10 is a perspective view illustrating configurations of a partition plate and a line heat detector in a fourth modification of the embodiment.
Figure 11:
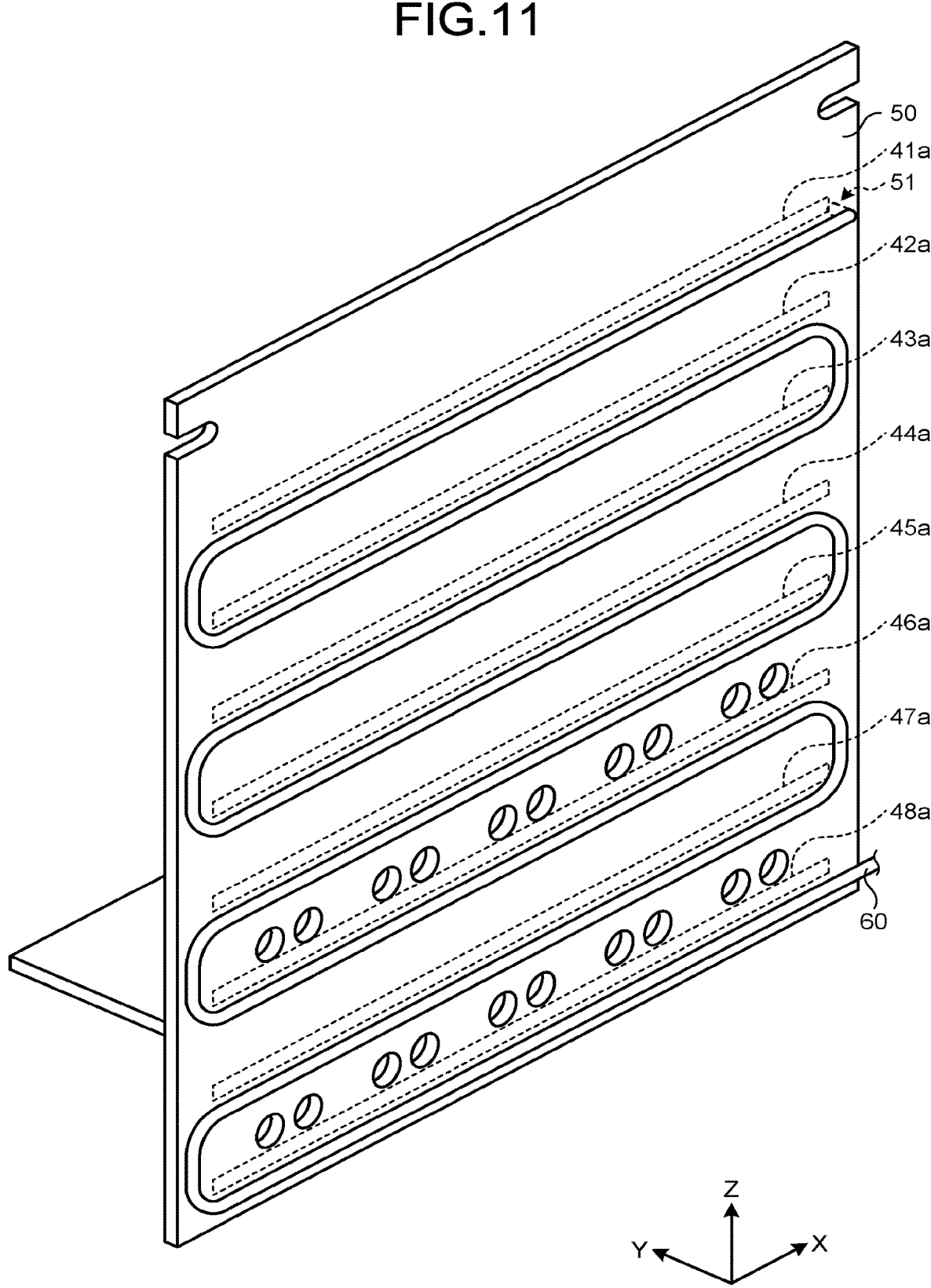
FIG. 11 is a perspective view illustrating configurations of a partition plate and a line heat detector in the fourth modification of the embodiment.

Alternatively, the LHD 60 may be laid on the partition plate 50. The LHD 60 may be laid as illustrated in FIGS. 10 and 11. FIG. 10 is a perspective view illustrating configurations of a partition plate 50 and a line heat detector (LHD) 60 according to a fourth modification of the embodiment, and corresponds to a +Y-side surface of the partition plate 50. FIG. 11 is a perspective view illustrating configurations of the partition plate 50 and the line heat detector (LHD) 60 according to the fourth modification of the embodiment, and corresponds to a −Y-side surface of the partition plate 50.

In any of an external short-circuit mode and a ground fault mode, it is sufficient that the temperature increase of the battery pack 20 can be detected at a position close to the bottom surface. Therefore, the LHD 60 is laid in a continuous shape by being attached to the side of the partition plate 50. In this case, the position of the line of the LHD 60 may be a position close to the vicinity of the bottom surface of the battery pack 20.

In the partition plate 50, the side surface on the −Y side of the shelf boards 31 to 36 (see FIG. 2) included in the shelf board group 30 makes thermal contact with the surface on the +Y side illustrated in FIG. 10. The LHD 60 continuously extends near the side surfaces of the shelf boards 31 to 36 on the +Y-side surface. On the +Y-side surface of the partition plate 50, contact regions 31*a* to 36*a* with which the side surfaces on the −Y side of each of the shelf boards 31 to 36 make contact are surrounded by dotted lines. The LHD 60 continuously extends near the contact regions 31*a* to 36*a*.

In the partition plate 50, the side surface on the +Y side of the shelf boards 41 to 48 (see FIG. 2) included in the shelf board group 40 makes thermal contact with the −Y-side surface illustrated in FIG. 11. The LHD 60 continuously extends near the side surfaces of the shelf boards 41 to 48 (see FIG. 2) on the −Y-side surface. On the −Y-side surface of the partition plate 50, contact regions 41*a* to 48*a* with which the side surfaces on the +Y side of each of the shelf boards 41 to 48 make contact are surrounded by dotted lines. The LHD 60 continuously extends near the contact regions 41*a* to 48*a*.

For example, as illustrated in FIG. 10, the LHD 60 extends in the −X direction on the −Z side of the contact region 36*a*, and extends in the +Z direction from the contact region 36a to the contact region 35a. The LHD 60 extends in the +X direction on the −Z side of the contact region 35a, and extends in the +Z direction from the contact region 35a to the contact region 34a. The LHD 60 extends in the −X direction on the −Z side of the contact region 34a, and extends in the +Z direction from the contact region 34a to the contact region 33a. The LHD 60 extends in the +X direction on the −Z side of the contact region 33a, and extends in the +Z direction from the contact region 33a to the contact region 32a. The LHD 60 extends in the −X direction on the −Z side of the contact region 32a, and extends in the +Z direction from the contact region 32a to the contact region 31a. The LHD 60 extends in the +X direction on the −Z side of the contact region 31a, and extends in the −Y direction from the contact region 31a to the contact region 41a through the through hole 51.

Moreover, as illustrated in FIG. 11, the LHD 60 extends in the −X direction on the −Z side of the contact region 41a, and extends in the −Z direction from the contact region 41a to the contact region 42a. The LHD 60 extends in the +X direction on the −Z side of the contact region 42a, and extends in the −Z direction from the contact region 42a to the contact region 43a. The LHD 60 extends in the −X direction on the −Z side of the contact region 43a, and extends in the −Z direction from the contact region 43a to the contact region 44a. The LHD 60 extends in the +X direction on the −Z side of the contact region 44a, and extends in the −Z direction from the contact region 44a to the contact region 45a. The LHD 60 extends in the −X direction on the −Z side of the contact region 45a, and extends in the −Z direction from the contact region 45a to the contact region 46a. The LHD 60 extends in the +X direction on the −Z side of the contact region 46a, and extends in the −Z direction from the contact region 46a to the contact region 47a. The LHD 60 extends in the −X direction on the −Z side of the contact region 47a, and extends in the −Z direction from the contact region 47a to the contact region 48a. The LHD 60 extends in the +X direction on the −Z side of the contact region 48a.

As described above, the LHD 60 continuously extends near the side surfaces of the shelf boards 31 to 36 and 41 to 48 on the surface of the partition plate 50. Even with this configuration, it is possible to detect the temperature of the battery pack 20 in which thermal runaway is about to start, and it is possible to detect an increase in ambient temperature due to the ground fault current. In addition, as compared with a case where a detection circuit is added for each battery pack 20, a space for detection can be greatly saved, so that an arrangement space of the battery packs 20 can be easily secured. As a result, it is possible to detect a sign of thermal runaway due to overcharging and/or a sign of a ground fault while securing energy density. Therefore, it is possible to take measures to prevent occurrence of hazard caused by overcharging and/or a ground fault in advance, and it is possible to improve convenience of the storage battery device 1.

Even in this configuration, the detection temperature (for example, 70° C. to 90° C.) of the LHD 60 is lower than the temperature at the time of fire occurrence in the storage battery device 1. As a result, the LHD 60 can detect a sign of thermal runaway due to overcharging and/or a sign of a ground fault, and can detect a sign of a fire. Therefore, it is possible to take measures to prevent the occurrence of the fire in advance, and it is also possible to improve convenience of the storage battery device 1 from this viewpoint.

Although some embodiments of the present invention have been described, these embodiments have been presented as examples, and are not intended to limit the scope of the invention. These novel embodiments can be implemented in various other forms, and various omissions, substitutions, and changes can be made without departing from the gist of the invention. These embodiments and modifications thereof are included in the scope and gist of the invention, and are included in the invention described in the claims and the equivalent scope thereof.

The invention claimed is:

1. A storage battery device comprising:
   a housing;
   battery packs accommodated in the housing and electrically connectable to each other; and
   a heat detection member having a heat detection function and having a linear structure continuously extending while making thermal contact with a member located near bottom surfaces of the battery packs, the member being connected to ground potential via the housing, the heat detection member including a part spaced apart from the battery packs while extending along the battery packs.

2. The storage battery device according to claim 1, further comprising a shelf board on which the battery packs are placed, the shelf board being connected to ground potential via the housing,
   wherein the heat detection member includes a line continuously extending near the battery packs on a surface of the shelf board.

3. The storage battery device according to claim 1, further comprising:
   shelf boards on each of which battery packs are placed, the shelf boards being connected to ground potential via the housing; and
   a partition plate making contact with a side surface of each of the shelf boards,
   wherein the heat detection member includes a line continuously extending near side surfaces of the shelf boards on a surface of the partition plate.

4. The storage battery device according to claim 1, further comprising:
   shelf boards on each of which battery packs are placed, the shelf boards being arranged in a planar direction and being connected to ground potential via the housing; and
   a partition plate making contact with a side surface of each of the shelf boards, the partition plate being placed between the shelf boards in plan view,
   wherein the heat detection member includes a line extending over the shelf boards through the partition plate and continuously extending near the battery packs on a surface of each of the shelf boards.

5. The storage battery device according to claim 1, further comprising shelf boards on each of which battery packs are placed, the shelf boards being arranged in a height direction and being connected to ground potential via the housing,
   wherein the heat detection member includes a line extending over the shelf boards and continuously extending near the battery packs on a surface of each of the shelf boards.

6. The storage battery device according to claim 1, wherein
   the battery packs are grouped into branches, and
   the heat detection member includes lines corresponding to the branches, each of the lines continuously extending while making thermal contact with a member located near the corresponding battery packs in the corresponding branch.

7. The storage battery device according to claim 6, further comprising:
   an output line electrically connected between the battery packs and an output node; and
   switches corresponding to the branches, each of the switches electrically connecting the output line and the corresponding branch.

8. The storage battery device according to claim 1, further comprising a resistive element, wherein
   the heat detection member includes
      two signal lines whose one ends are connected to each other via the resistive element and the other ends are applied a bias voltage, and
      an insulating coating configured to electrically insulate the two signal lines from each other, the insulating coating including a heat-meltable resin whose melting temperature corresponds to a predetermined detection temperature.

9. The storage battery device according to claim 8, further comprising:
   a voltmeter configured to measure a potential difference between the other ends of the two signal lines, and
   a control circuit configured to detect increase in temperature based on a measurement result of the voltmeter and the predetermined detection temperature.

* * * * *